(12) United States Patent
Apgar et al.

(10) Patent No.: US 8,595,377 B1
(45) Date of Patent: Nov. 26, 2013

(54) APPARATUS AND METHOD FOR FLEXIBLE DELIVERY OF MULTIPLE DIGITAL VIDEO STREAMS

(75) Inventors: Brian Arthur Apgar, Cupertino, CA (US); Matthew Thomas Graham, Campbell, CA (US); Lawrence Charles Hastings, Sunnyvale, CA (US); Jeffrey Allen Robinson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1670 days.

(21) Appl. No.: 11/318,067

(22) Filed: Dec. 23, 2005

Related U.S. Application Data

(60) Provisional application No. 60/638,693, filed on Dec. 23, 2004.

(51) Int. Cl.
*G06F 15/16* (2006.01)
*H04N 7/18* (2006.01)

(52) U.S. Cl.
USPC .......................................... 709/233; 348/143

(58) Field of Classification Search
USPC .......................................... 348/143; 709/233
See application file for complete search history.

(56) References Cited

U.S. PATENT DOCUMENTS

| | | | |
|---|---|---|---|
| 7,859,571 B1 * | 12/2010 | Brown et al. | 348/211.3 |
| 2003/0062997 A1 * | 4/2003 | Naidoo et al. | 340/531 |
| 2005/0038326 A1 * | 2/2005 | Mathur | 600/300 |
| 2005/0091359 A1 * | 4/2005 | Soin et al. | 709/223 |

* cited by examiner

*Primary Examiner* — Richard Torrente
(74) *Attorney, Agent, or Firm* — Schwegman Lundberg & Woessner, P.A.

(57) ABSTRACT

A video control server includes a central processing unit and a memory storing executable instructions to receive control station commands, update state information specifying how network video sources are to be assessed and displayed by a client, and send the state information to the client.

16 Claims, 5 Drawing Sheets

APPARATUS AND METHOD FOR FLEXIBLE DELIVERY OF MULTIPLE DIGITAL VIDEO STREAMS

CROSS REFERENCE TO RELATED APPLICATIONS

This application claims the benefit of U.S. Provisional Application No. 60/638,693, entitled "System for Flexible Delivery of Multiple Digital Video Streams," filed on Dec. 23, 2004, the contents of which are hereby incorporated by reference in their entirety.

BRIEF DESCRIPTION OF THE INVENTION

This invention relate generally to the processing of video data. More particularly, this invention relates to a technique for delivering multiple digital video streams in a networked environment.

BACKGROUND OF THE INVENTION

One important application for video is in security and surveillance. For some time, the common approach for building video surveillance systems is to connect analog video from multiple cameras to a device called a Matrix Switch. FIG. 1 illustrates a prior art system 100. The matrix switch 102 switches video from the multiple inputs, e.g., video cameras 104, 106, 108 and 110, to a smaller number of outputs, which are then displayed on analog video monitors 112, 114 and/or recorded with analog video tape recorders. The matrix switch 102 receives its control inputs from a dedicated keyboard 116 or through a serial cable connected to a computer system where a software program is used to support a user interface for controlling the matrix switch 102. The matrix switch 102 performs the actual switching in analog using dedicated analog video processing hardware. This hardware often includes features for automatically switching between inputs in a user defined rotation and video overlay of useful information such as names of the video sources or time and date information. There are many limitations to this approach, which is why matrix switches are rapidly being replaced by digital technology for video switching. The most significant problem is scaling the system. If a matrix switch supports 16 inputs, building a system with more than 16 video inputs is difficult. More than one switch is required and it is not possible to switch an input going to one switch to an output on a different switch. The second problem is that analog video is difficult to transmit more than a few hundred meters without specialized transmission equipment. This limits the system to a single location, which greatly limits its usefulness. Finally, control of the switch is either through a proprietary keyboard or though proprietary software run on a separate computer system. All of this makes using matrix switches to control viewing video in large scale and geographically dispersed installations impractical.

Today, video is often handled in digital form. This offers many advantages over analog video. Analog video is typically digitized and compressed by a dedicated hardware device called an encoder. The encoder generates a digital video stream that has been compressed in one of many digital video compression formats such as MPEG2, MPEG4 and MJPEG. The encoder also provides an interface to a standard data network such as Gigabit Ethernet and transmits the video using one of many standard network protocols such as TCP/IP or UDP. Other application layer protocols can be used on top of TCP such as HTTP and RTP to assist in the delivery of digital video to other devices connected to the network. There are several advantages that are gained by converting the video to digital form that can be transmitted over standard video networks. Scaling of the number of video sources is no longer an issue because an arbitrary number of sources can be handled. Standard network switches can be added for more network connections. The nature of IP switching and routing allows this scaling to work easily and smoothly. The digital data network allows the video to be transmitted over any distance. While copper Gigabit Ethernet is limited to several hundred meters, optical transmission can be used to achieve effectively unlimited distances. The data network also acts as a switching system. Digital video sources may be switched to any destination connected to the network. With IP networks, the switching is packet based, but modern IP networks are easily able to switch real-time streams of digital video between any source and any destination as long as there is no congestion encountered along the way and the needed paths through the network have sufficient bandwidth for the streams.

FIG. 2 shows a typical digital video network system 200. The network 201 is typically a local area network where Gigabit Ethernet switches are used to switch video. In such a LAN environment, congestion and bandwidth of the links is typically not an issue. But the network may also be a wide area network, such as the Internet. Analog video from cameras 202, 204, and 206, is digitized and encoded by hardware encoders 208, 210, and 212 connected to the network 201. Digital video from the encoders can be streamed to any destination on the network. To display a video source, a workstation e.g., 214 or 216 establishes a network connection to a source and then decodes the digital video before displaying it on a standard computer monitor. Software on the workstation can support receiving and displaying more than one video source at a time, so that several video windows can be decoded and displayed at once. This software can also allow a human operator at the workstation the ability to dynamically choose which of many digital video sources to connect to and display.

Server computers 218, 220 may also connect to the network 201 both to receive and transmit digital video. These servers can provide other functions including recording the video to disk storage, playing back recorded video and replicating video streams so that a single video stream can be received by multiple client workstations or servers without the need for multicast transmission from the source. The combination of the digital video encoders, network and client workstations provide a much more flexible and scalable video switching and display system. For this reason, systems that use this approach are sometimes referred to as "virtual matrix switching" systems.

While the networked digital video system provides many advantages over the previous analog system, it still has a number of major limitations. Because of the completely distributed nature of the architecture, there is no centralized way to control the display of the video on the client workstations. While this is not a problem when there are a small number of workstations, each staffed by an individual capable of manually controlling the workstation, it becomes a huge problem when attempting to construct a command center where many video feeds must be displayed and controlled simultaneously for a team of people. There is also no way for a user at one workstation to control video displayed on another workstation. This is a critical feature for a large-scale digital video security system where an operator at a single workstation viewing a video feed needs to be able to instantly alert multiple decision makers at many locations of an incident that they need to see on their workstations. Finally, there is nothing in this architecture that can automatically deal with the failure of the different components. While IP networks tend to "self heal" in response to failures of network components and paths, the failure of digital video sources, client workstations and servers must be handled manually. Clustering software can provide automatic failover of servers to backup machines, but there will be a service interruption during this failover period.

In view of the foregoing, it would be desirable to provide an improved technique for distributing video data.

SUMMARY OF THE INVENTION

A video control server includes a central processing unit and a memory storing executable instructions to receive control station commands, update state information specifying how network video sources are to be accessed and displayed by a client, and send the state information to the client.

The invention provides multiple advantages over previous technologies, such as analog video switches and so called "virtual matrix switching". These advantages include very flexible scaling to any number of sources and display systems and the ability to control large numbers of display systems in a large command center from a single control station. Furthermore, the system is based on conventional technology without the need for any proprietary hardware.

The invention facilitates the creation of large, scalable command centers where unlimited numbers of digital video channels can be displayed under the control of a single Web browser or application server software. Further, a single workstation can command multiple video streams to be instantly displayed on other client workstations anywhere in the network, even those spread to multiple geographic locations. Finally, an embodiment of the invention provides a means to provide automatic failover in the event of failure of video sources, servers or network connections.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 3:
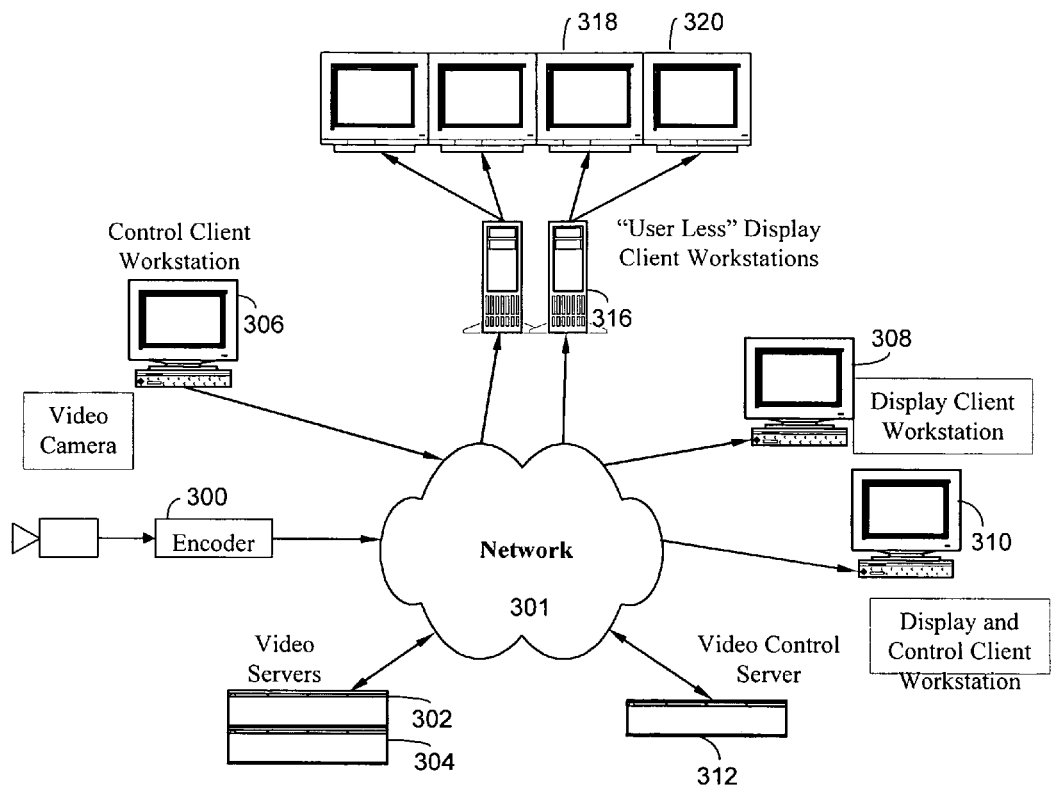
FIG. 3 illustrates a system configured in accordance with an embodiment of the invention.

FIG. 3 illustrates digital video sources, such as an encoder 300 and video servers 302 and 304 connected to a network. Client workstations are connected to the network and they can perform one or both of two separate functions: display of video streams or control of video streams. A client workstation that provides only video control is called a Control Client Workstation 306. A workstation that only provides display of video streams is called a Display Client Workstation 308. It is also possible for a client workstation to perform both functions, and in this case is referred to as a Control and Display Workstation 310.

A Video Control Server 312 is connected to the network 301 and receives video control commands from the control clients and stores them in an internal video state file. This video state file describes the video feeds that are to be displayed on each of the video display clients, and the number, size, position, windows titles and window borders of the windows containing these video feeds. When a control client sends a video control command to the video control server, the server updates the video state file and then sends the relevant changes to any affected display clients. When a display client first connects to the network, it connects to the video control server and identifies itself with a unique name. The video control server then sends it a full copy of all of the video state for that display client. Using the video control state from the video control server, the display clients connect directly to the specified video feeds and display them in windows on their screens with the proper size, position, and window treatment. Some of the video display clients shown are conventional personal computers. Users at these workstations can manually launch the video display client software and use it in addition to any other tools or software they wish to use. Also shown are "User Less" display client workstations 316. These are conventional personal computers that do not have a keyboard or mouse. They have the display client software installed and configured to automatically launch and connect to the network as part of the normal start-up process for the workstation. In the figure, each of these user-less display clients 316 is connected to two video monitors 318, 320. This is commonly done today with video adapter cards that are capable of driving two separate displays. By using multiple user-less display clients, video walls in large command centers can easily be created.

Figure 1:
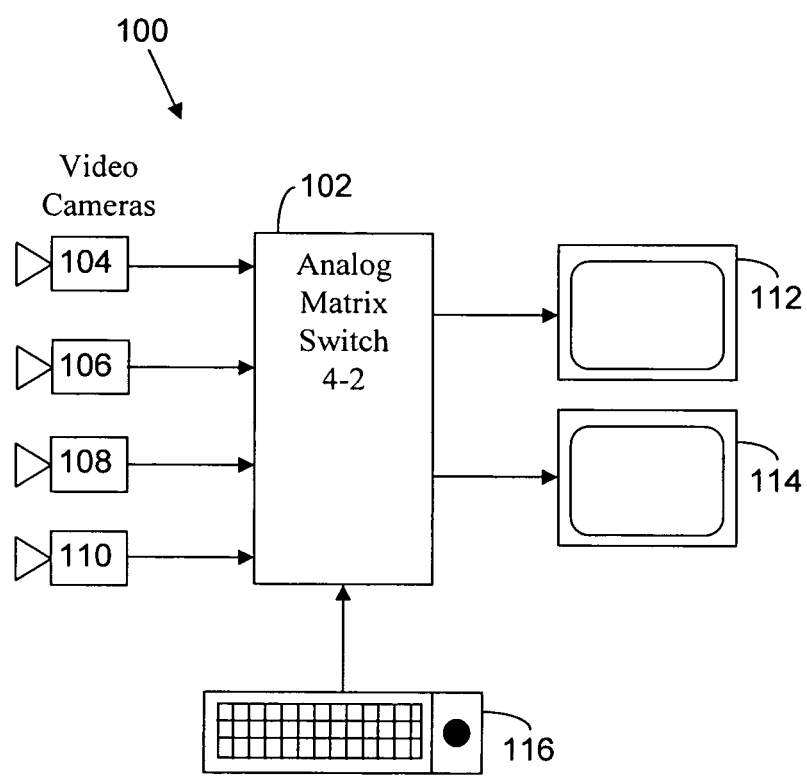
FIG. 1 illustrates a prior art system utilizing an analog matrix switch.
Figure 2:
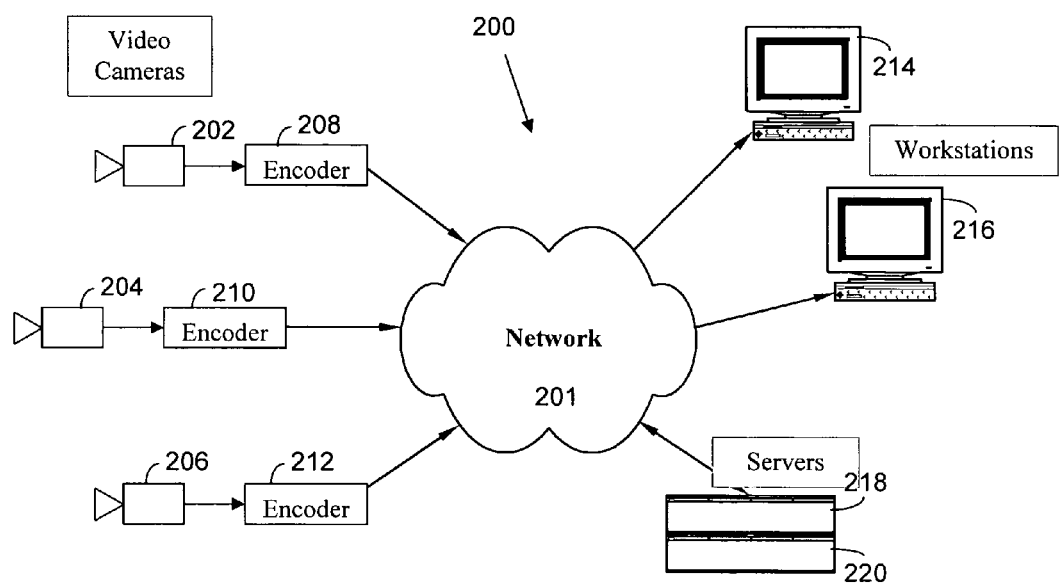
FIG. 2 illustrates a prior art digital network for routing video data.

In existing networked digital video systems such as shown in FIG. 2, the client workstations perform both the control and display functions. This means that a user or program at a client controls which video feeds are to be displayed at only that client. The clients have no means to affect or control what video feeds are displayed on other clients. Since the clients in the existing system have no means to control the display of video on other clients, there is no means to store the control information in a server on the network.

This gives the current invention numerous advantages over the prior art. By allowing the control functions to be separated, a single workstation can control what is displayed on any number of display clients. This enables the creation of large video walls in a command center that all can be controlled from a single station. Also, if a particular video feed needs to be shown immediately to a decision maker at a remote location, the control station can send a single command to the control server causing the remote display client to immediately connect to and display the specified video feed.

In the prior art, there is no special ability to deal with failures of client machines, video sources or the network. For example, if in the existing system a client workstation is shut down, momentarily loses power or crashes, upon restart an operator must manually reconnect to each video feed. With the present invention, if a control client is shut down or disconnected from the network, there is no effect on the display clients and the control server. Video continues to be displayed on all of the display clients. On restart of the control client or reconnection to the network, updates to the video control state may resume and occur normally. If a display client is shut down, or is temporarily disconnected from the network, upon restart or reconnection to the network, the display client fetches the video control state from the video control server and automatically resumes displaying all the video feeds. If the control state has been changed while the display client has been unavailable, the newly updated state is correctly loaded and used.

The current invention allows for redundant video control servers and video sources. More than one video control server can be connected to the network. The control client workstations can easily send their video control commands to all of the video control servers. Each display client will use one of the control servers as a primary server and the alternates as backups. The display clients can send a regular "heart beat" message to the primary video control server to test that it is available and working. If this heartbeat is lost, the display client can connect to one of the alternate servers and register with it to receive a current copy of the display state and all future updates. If the digital video system supports the concept of primary and backup video sources, two video control servers can be used to store state for displaying each of the sets of video feeds. In the event of a failure that causes the loss of the primary video feeds, a command can be sent to the primary video control server that causes all of the display clients to switch to the secondary video control server. When they connect to the secondary control server, the display clients will receive a new copy of the video control state that instructs them to use the secondary video feeds.

Figure 4:
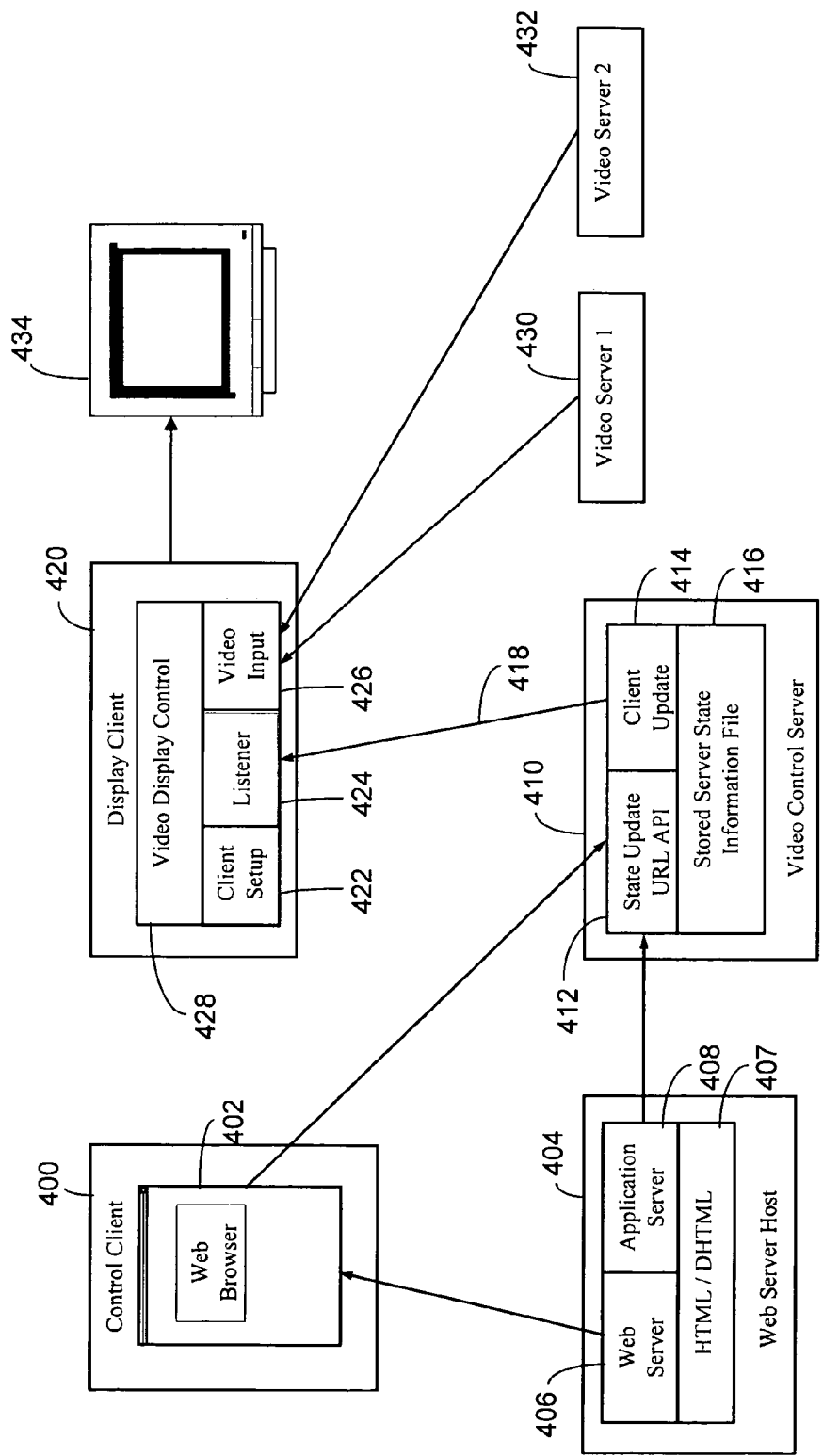
FIG. 4 illustrates components utilized in accordance with an embodiment of the invention.

FIG. 4 shows various components for implementing an embodiment of the invention. The control client 400 runs a Web browser 402 that displays a Web page from HTML or DHTML generated by the Web server host 404. The Web server host 404 is a server computer that executes a conventional Web server 406 that is well known to client-server application developers. Web server 406 software such as Apache, processes stored HTML, which is sent to the Web browser 402 on the control client 400. Optionally, the Web server 406 host can also execute some form of application server logic 408 for the dynamic generation of HTML, also known as DHTML 407. This server-side application logic 408 could be implemented in any of a variety of well known technologies including JSPs, PHP or other CGI logic.

The HTML executed by the Web browser 402 can contain clickable buttons and links that cause URL commands to be sent to the Video Control Server 410. These URLs use the well known HTTP GET format for sending a command to server-side CGI logic running on a Web server. This format specifies a host name, path name to a CGI program and a set of name/value pairs to pass as arguments to that program, for example:

http://hostname/path1/path2/ . . . /program?name1= value1&name2=value2& . . . &namex=valuex The name value pairs are passed to the CG I program "program".

In addition, server-side application logic 408 running on the Web server host can also issue HTTP GET commands to the video control server 410. In either case, these commands are sent as HTTP requests to the video server using HTTP to transmit them over a network either from the browser or the server-side application logic.

The video control server 410 is a program running on a server computer connected to the network. It uses two network ports for communications with other computers on the network. The first port is used to receive HTTP protocol commands through the state update URL Application Program Interface (API) 412 and the second is used to send commands to the display clients through the client update interface 414. The HTTP GET commands to the video control server are used for setting, updating and reading out the stored video state file 416. When video state for a particular display client has been modified, the video control server sends the changed state out the second network port to the affected display client, as shown with arrow 418.

The display client 420 is a software program running on a standard computing device, e.g., a personal computer, personal digital assistant, and the like. In one implementation it is a personal computer running Windows XP. The display client software consists of several modules. The client setup file 422 is a small text configuration file that defines the hostname and port for the video control server it is to listen to, the name for the client machine, and the screen resolution, size and origin for the main video window and whether this window should have a border. Below is an example of a client setup file 422:

```
server
{
    host = linux3
    port = 1066
    client name = 1
}
main window
{
    resolution = 1280x1024
    x = 0
    y = 0
    width = 1280
    height = 1024
    frameless = true
}
```

In this example, the hostname of the video control server is linux3, connection port is 1066 and the client name is "1". The display client program can be configured to use part or the entire screen for displaying multiple video windows. In the example above, the screen has a resolution of 1280×1024 and the display client program is being given the entire screen.

The next module of the display client program is the listener 424. The listener 424 includes executable instructions to listen to the host and port specified by the setup file for state update commands from a video control server 410. The commands are sent as a byte stream via a TCP Socket connection.

The video input module 426 establishes network connections for the video sources specified by the video control state sent to the display client. It receives the video streams and decodes the video in preparation for display. In one embodiment, this is software implemented using DirectShow on a Microsoft Windows XP platform. Finally, the video display control module 428 properly scales and positions and displays each of the video streams on the display 434. The size, position, borders and titles of these windows are controlled by the video control state.

In one embodiment, the Video Control Server state information 416 is stored as ASCCII text. It is stored in a disk file on the video control server 410. The file is typically updated when any changes are made to the state through the state update API 412. Exceptions to this occur for certain types of state information that changes very rapidly and the option to not update the file is specified in the command. This will be explained below in connection with the details on the state information. The state information may be organized in a hierarchical fashion using curly braces for delimiting the levels of the hierarchy. The general form of the state information can be thought of as keys and variable definitions.

Each key is defined by a name followed by open and close braces { }. Keys can hold variable definitions and sub-keys to create the hierarchy. At each level of the hierarchy, variable definitions occur first as a list of name=value pairs followed by all the key definitions. The keys have the concept of variable scope, so a variable name needs to be unique only to it's key. Therefore, the variables with the same name, but defined in different keys or sub-keys are unique. Variables are simply text in "name=value" form. The names and values may use any alpha-numeric characters '_' and '-'. Double forward slashes '//' denote comments. Here is an example, where '..' indicates repetition of more variable definitions or key definitions or both as appropriate.

```
name1 = value
...
key1
{
  name1 = value
  name2 = value
  ...
  //This is a comment
  key2
  {
    name1 = value
    ...
    key3
    {
      ...
    }
  }
  key4
  {
    ...
  }
  ...
}
key5
{
  name = value
}
...
```

At the top level of the hierarchy, variables are defined as is seen in the example. It is also possible to have multiple keys at the same level. Note that key1 and key5 are both at the top level and key2 and key4 are at the second level.

It is important to note that the video control server 410 does not need to interpret the state information, with the exception of the server key, which is used to define what TCP/IP port to listen on for client connections. As far as the video control server 410 is concerned, the state information is merely hierarchically organized text-defined name/value pairs that follows a set of syntax rules for creating the hierarchy and querying, defining or clearing the variables. The video control server 410 assigns no meaning to the variable names or their values. This makes the video control server 410 a completely general-purpose state storage system for the control clients and display clients. New functions can be added to the system by changing the control client HTML/DHTML and the display client software. No changes to the video control server 410 are needed.

In one embodiment, the video control server state update commands are implemented as HTTP GET commands. All of the commands return their results via HTTP. This is the general form of the URL commands:
  http://hostname:port/e?command=<command>&key=
    <key>&name=<name>&value=<value>&cache=
    <true|false>&pre=<true|false>

In one implementation, the video control server 410 acts as an HTTP server. So that it can be run on the same physical machine as a conventional Web server where HTTP requests are typically handled on port 80, the video control server may be set to respond to HTTP requests for the URL API through port 8086. This port could be any other TCP/IP port value not already used by another network service. The video control server 410 is also implemented so that "/e" is a pseudo-CGI path. This allows use of the HTTP GET syntax to pass commands via HTTP.

There are 5 different commands supported through the state update URL API. They are dump, get, set, multi-set and remove.

The dump command looks like:
  http://hostname:8086/e?command=dump

This command returns the entire state file as text. The command also supports an option &pre=true which will enclose the returned text in the HTML tags <pre></pre> to make the returned text displayable on a Web browser.

The get command looks like:
  http://hostname:8086/e?command=get&key=key1/
    key2&name=name1

It returns the value of the specified variable. It requires two arguments: the key holding the variable and the name of the variable. The key argument must define the hierarchy of the selected sub-key. This is done by starting at the top level of the hierarchy and enumerating each of the key names separated by slashes until the target sub-key is reached. If the variable that is to be retrieved by the get command is at the top level, no key argument is supplied. Also, it is possible to specify the path to a variable in the variable name itself. Therefore, all three of the following are equivalent:
  &key=key1/key2&name=name1
  &key=key1&name=key2/name1
  &name=key1/key2/name1
This also applies to all of the other commands that use key and name arguments.

The set command looks like:
  http://hostname:8086/e?command=set&key=key1/
    key2&name=name1&value=newvalue This causes the variable "name1" in sub-key key2 to be set to "newvalue". If the variable "name1" in this sub-key did not already exist, it would be inserted into the sub-key along with its new value. The set command also supports an optional argument &cache=false. If this argument is supplied, the new value is not written into the disk file that the video control server uses to store the state information. The new value is stored in memory and transmitted to the display clients listening on the client update port. The next time a set command without the &cache=false argument or a multi-set command is issued, the in-memory copy of the state will be written to the disk file, causing the variable to be updated on disk. This optional argument is useful for state variables that need to be updated very frequently, so that storing them in the disk file is a waste of time and a potential performance bottleneck. Examples of such variables will be described later.

The multi-set command looks like:
  http://hostname:8086/e?command=multi-set&key=
    key1&name=name1&value=newvalue1&name=
    name2&value=newvalue2

The multi-set command supports one key argument and one or more pairs of name/value arguments. Again, if any of the variables being set did not already exist, they will be created. If the variables to be set specify the key path in all of the variable names, the key argument may be omitted. A magic name of '#' is supported to allow a multi-set of variables named with monotonically increasing integers as their names. For example:
  http://hostname:8086/e?command=multi-set&key=
    key1&name=#&value=newvalue1&value=
    newvalue2& value=newvalue3

Sets the following variables:

```
key1
{
    1 = newvalue1
    2 = newvalue2
    3 = newvalue3
}
```

The multi-set command supports the optional &cache=false argument in the same fashion as the set command. Another optional argument is &clear=true which is used with a key argument. This form of the command clears the contents of the specified key along with all sub-keys of all of the names, values and sub-keys before writing any of the new name/value pairs.

The remove command looks like:
    http://hostname:8086/e?command=remove&key=key1
It removes key1 and all sub-keys and their contents.

Attention now turns to the use of client definitions to control server state information. While the variable definitions in the video control state have no meaning to the video control server, in this invention the control client and display client use a number of key and variable definitions to support their functions. These will be described in turn.

The following code shows an overall hierarchy of key/variable definitions that may be used in accordance with an embodiment of the invention. The order of the key definitions is not important, but the hierarchy is.

```
cameras
{
    camera name
    {
        url = protocol://host/etc
        no rotation = true | false
        isarchive = true| false
        // the rest of these are only used when archive is true
        seek event = unique string
        seek time = time
        time = time
        command event = unique string
        command = playforward | playbackward | pause | stop
    }
    camera name 2
    ...
}
clients
{
    client name
    {
        active window = number
        dwell time = number
        template = name
        camera rotation
        {
            1 = first camera name
            2 = second camera name
            ...
            force rotation = true
        }
    }
    client name 2
    {
        link to = client name
    }
}
server
{
    port = 1066
}
```

```
templates
{
    resolution
    {
        template name
        {
            active color = sixhexdigits
            active camera = camera name
            inactive color = sixhexdigits
            border = number
            title height = number
            1
            {
                x = number
                y = number
                width = number
                height = number
            }
            2
            {
                ...
            }
        }
    }
}
```

The cameras key holds the definitions for all of the video sources to be displayed on all of the display clients. These sources may be live feeds and recorded archives.

The clients key holds the definitions of all the display clients including their names and a list of all of the cameras to be displayed on each display client.

The server key holds the port number that the control server sends state updates to the display clients. The display clients listen for those state updates on the specified port.

The templates key holds the definitions of all possible window layouts on the display clients. The templates definitions will has layouts for all the different display resolutions of the display clients.

The server key is used to define the TCP/IP port that the server listens on for client connections.

```
server
{
    port = 1066
}
```

By defining this as a variable, it is possible to run multiple instances of the video control server software on the same physical server and use different port numbers to distinguish them to the display clients. If a control client updates the port variable, the video control server will send the updated value to all of the display clients on the port defined by the previous value of the port variable. All future communication with the display clients will be on the new port.

Cameras are video feeds that are displayed by the display clients. They may be live video feeds or recorded video archives. This is the general definition of the camera key of the video state information:

```
cameras
{
    camera name
    {
        url = protocol://host/etc
        no rotation = true | false
```

-continued

```
    isarchive = true | false
    // the rest of these are only used when archive is true
    seek event = unique string
    seek time = time
    time = time
    command event = unique string
    command = playforward | playbackward | pause | stop
    }
  camera name 2
  ...
  }
```

Each camera has a uniquely named sub-key in the cameras key. The camera name can be any text string of allowed characters. The variable "url" specifies a string used by the display clients to establish a network connection to the video feed for the camera. In one implementation, the url string for the video feed is specific to a certain video server, in particular the BroadWare Interactive Media Server. Other models of video servers or video sources could be supported by providing the specific information needed by these servers or sources in this url string, or in additional variables defined in the camera sub-key. The display client uses the different information to establish the network connection to the specified sources. The "no rotation" variable defines whether the camera is allowed to rotate when it is displayed on a display client. Rotation refers to automatically cycling through a list of cameras in a group of windows on the display client. This is a common function in a video surveillance application and allows a large number of video feeds to be displayed in a small number of windows by periodically cycling through the video feeds. The rotation function is controlled in this invention by variables defined in another key called "templates" which defines the windows on the display clients. With automatic rotation, it is desirable to be able to selectively disable it on a camera, which is why the "no rotation" variable is used. If the camera is a live video feed, no other variables are needed.

If the video is a recorded archive, additional variables control playback and seeking into the archive. The "isarchive" variable is set to true to indicate an archive. Camera archives support several other variables that are used to control playback, support seeking to specific times in the archive and support approximately synchronizing the playback of the archive on multiple display clients.

To cause the playback of the video archive to seek to a different location in the stored video, a seek command is issued. This is done by setting the "seek event" and "seek time" variables. The seek event is a text string that is unique from any previous values, this allows the display clients to distinguish new seek commands from previous ones. A random number or a monotonically increasing number are good choices. The seek time is simply the time that the display client should request the video server storing the video archive to seek to. Different video servers may use different time formats to represent the time in the stored archive. The specific time format is not relevant, but in one implementation, the JavaScript function Date.getTime( ) format is used. This is a floating-point number representing the number of seconds since January $1^{st}$ 1900. This is a convenient format to use since script in the control client Web page can use this and other related JavaScript functions for creating and formatting time values to be sent to the video control server. It is recommended that the multi-set command be used when setting the seek event and seek time variables. If this is not done, it is possible that the display clients will receive the seek event command before they receive the seek time and they may improperly seek to the previous value of the seek time. If a multi-set is used, they will receive the seek event command and seek time in the same state update.

The "time" variable is used to approximately synchronize the playback of the same archive in multiple windows on the same or multiple display clients, as explained below. The "command event" and "command" variables are used to control the playback of the archive. The "command event" variable is like the "seek event" variable. It is a unique text string such as a random number or monotonically increasing number. The "command" variable is the function to be performed: play-forward, play-backward, pause, stop. Like the "seek event" and "seek time" variables, it is recommended that a multi-set command be used to set both the "command event" and "command" variables at the same time.

The invention allows separate windows on a single display client or multiple display clients to either independently play the same archive or to approximately synchronize their playback under the direction of the control client and the video control server. With independent playback, each client can be playing the archive at a different point in time in the recorded video. Starting, stopping, pause, playing backwards and seeking can be done independently on each display client even for the same archive. This is the way that recorded video playback works with prior-art systems as shown in FIG. 2. Each client connects through the network to the video servers to independently initiate and control the playback of a recorded archive feed. With the present invention, this is accomplished by defining multiple cameras—one for each window on a display client or clients that will show the archive. Each of these camera definitions will reference the same archive in the url source definition variable. But by using separate camera definitions, separate variables for seeking and controlling playback will be available, thereby allowing the playback of the same archive to be independently controlled in each window and on each display client.

With synchronized playback of an archive, multiple display clients can approximately synchronize their playback of the same archive under the direction of the control client and video control server. As a result, a single command to seek, play, pause, stop or play backwards will cause the same function to be performed at each display client. The playback will not be exactly synchronized to a single frame, but to within fractions of a second. This will be determined by slight differences in the arrival time of the commands from the video control server to each of the display clients and the time they require to send commands to the video server to control the stream. However, from a user perspective the control of the display clients will be effectively synchronized. This is useful in many applications. One example is a command center where an operator sitting before a control client and display client or a combined control and display client can view an archive video feed while that archive video is also displayed on a video wall monitor for others to view while being driven from a second display client. Using a variety of methods, the operator can change the point at which video is being played from the archive and cause the second display client to move it's playback point from the archive to the same place. This allows an operator to look for areas of interest in the recorded video and make them viewable to others looking at video displayed from other display clients.

In one embodiment, it is assumed that each window of live or archive video being displayed on a display client corresponds to a unique video feed from a video server. When the same live cameras or camera archives are to be displayed more than once, the video server is responsible for replicating the video feed as it is sent to the display clients. While it is technically possible to make use of IP Multicasting to cause multiple display clients to connect to the same video stream from a video server, multicasting need not be used. IP Multicasting has a number of limitations. It is not universally supported by video streaming systems, and it cannot be used across sub-network boundaries unless the router supporting the links between networks supports it. Even with router support, multicasting is not supported over the Internet except in experimental deployments. Thus, to stream video from a video server to display clients that may be at remote locations, conventional IP video streams are assumed, where each video stream from a video server to a display client is a separate network connection and multicasting is not used.

In order to approximately synchronize the playback of an archive of different display clients, there is an additional complication that must be solved. A particular display client might not be currently displaying an archive when a seek or playback control command is issued from the control client. This can happen for a number of reasons. The archive might be in a camera rotation and the archive is currently rotated out and is not being displayed. It is also possible that a display client might have the camera added to its list of cameras to display after the archive playback has started. It is also possible that the display client might lose network connectivity for a period of time or might be shut down and later restarted. Despite these scenarios, the display client should start or resume playback of the archive camera approximately synchronized with the other clients that are already playing that archive. Using the time variable in the camera definition does this. In order to synchronize the playback of an archive on multiple display clients, one instance of the playback of the archive must be chosen as a master to whom all the others are synchronized. In one embodiment, the control client is also displaying the recorded archive as it plays and all of the display clients are synchronized to this instance of the archive playing. This is done using an ActiveX control imbedded in a Web page or a program running on the control client. HTML in the Web page on the control client loads the ActiveX control and gives it the URL address of the source of the video archive. The ActiveX control also supports a number of user interface elements to control the playback of video. These include on-screen buttons for VCR functions and a scroll bar that can be dragged to seek to any point in the video. Clicking on the VCR function buttons causes the corresponding command event. Issuing a multi-set command sets command values for the archive being viewed. When the scroll bar is used to seek to a new playback position, the seek command and seek time variables for the archive are set in the same fashion. As the video for an archive plays in the ActiveX control, the current playback time is sent periodically to the video control server. The archived video has time information embedded in the stream that indicates the time at which it was recorded. This time information is used by the video server to support seeking to arbitrary time points in the archive and is a common function in commercially available video servers. In one embodiment, the ActiveX control periodically sends the current playback time to the video control server to set the time variable in the camera archive. It is recommended to set this variable at least every several seconds. When a display client connects to the network after an archive has started playing or the an archive is being rotated in and out of being displayed, the display client uses the value of the time variable to seek to that position in the video before starting playback. The rate that the ActiveX control updates the time variable determines how far apart the playback time point will be on multiple display clients showing the same archive. In one embodiment, the update rate is once a second.

The clients portion of the state defines what should be displayed on each display client machine.

```
clients
{
    client name
    {
        template = name
        active window = number
        active camera = camera name
        dwell time = number
        camera rotation
        {
            1 = first camera name
            2 = second camera name
            ...
            force rotation = true
        }
    }
    client name 2
    {
        link to = client name
    }
}
```

The client name keys must match the names of the display clients as defined in the client setup files on the display clients. Note that multiple display client machines may share the same client name. If they do, they will display the same template and cameras. This can be useful when there are display clients at different geographic locations that need to display the same cameras.

The template variable defines the window template that should be used for the client. The display clients display a rectangular grid of windows called a template. Each of the windows is numbered starting with the upper left window as '1' and counting to the right and down, with the lower right window having the largest window number. The templates are defined in a separate section of the video control state that will be defined later.

The active window and active camera variables allow a camera to override the cameras in a camera rotation. They are optional variables that are only used if it is desired to override the camera rotation. The active window variable specifies which window in the template is considered the active window. This is an optional variable. If there is an active window defined, the next variable the active camera specifies will be displayed in that window. This allows a camera rotation to be overridden and a specified camera displayed in that window. If there is no active window, there is not an active camera defined.

The dwell time variable is required and specifies the delay time for the camera rotation in milliseconds. It determines the time delay between loading a camera in a window and the next camera in the next window of the rotation. If the dwell time is set to '0', there is no rotation.

The camera rotation key contains a list of cameras that are to be displayed on the display client. This is a required key. Within the key, a sequential list of window numbers is equated to the camera names that are to be displayed in that window in the template. It is recommended that at least one camera be defined in the camera rotation list for each of the windows in the template. Commonly, more cameras are defined in the rotation list than there are windows in the template, since this is the purpose of camera rotation—to cycle through a list of cameras that exceeds the number of windows that are available. The system works with fewer cameras in the rotation than there are windows in the template, but the rotation process causes cameras to appear in more than one window. When the display client launches, it loads the first camera in the rotation into window 1 of the template. After a delay of dwell time, the next camera in the rotation loads into the next window in the template and so on. If there is only one window, the next window is always the first and only window. When the bottom of the rotation list is reached, the next camera is the first camera in the rotation list. Windows in the window template operate in a similar way.

The force rotation variable is an optional variable that is used to cause all of the windows in the template to be reloaded with the cameras in the rotation list starting with the first camera and the first window in the template. If this variable is not set, and the cameras in the rotation list are changed, the new cameras will only appear when that camera is rotated into a window. When the force rotation variable is set, the cameras in the rotation list are loaded into the windows and the rotation is restarted with the next available camera in the list. This means that if there are four windows in the template, the first four cameras are loaded into the windows and after a delay of dwell time, the next camera in the list is loaded into the first window.

The link to variable is used to cause a display client to dynamically link to another client. This is more flexible than giving multiple clients the same name in their client setup file since the setup file can't be changed once the display client application has started.

The templates key holds the definition of all the possible window layouts that may be used by the display clients. As shown with the code below, they are organized by resolution and within a resolution each template is individually named. The resolution key is a text string to uniquely identify each resolution. It is recommended that the names be descriptive such as "1024×768", "1280×1024" etc.

Within an individual template definition, the active color defines the border color for the active window, the inactive color defines the border color for all other windows. The color values may be defined with six hex digits for the RGB color value, which is a standard way to define colors in computer systems. The border variable is an integer value that defines the border thickness in pixels for all four sides of the window. The title height specifies additional pixels at the top of the window for display of the title. The title text displayed is typically the camera name. If no title is desired, the title height may be set to zero.

The individual windows in a template are defined within keys named '1', '2', etc. The key names for the windows may be sequential integers. Within a template, the x,y variables define the coordinates on the screen of the upper left corner of the window where the screen coordinate of 0,0 defines the upper left corner of the screen. The width and height variables define the width and height of the window in pixels.

```
templates
{
    resolution
    {
        template name
        {
            active color = sixhexdigits
            inactive color = sixhexdigits
            border = number
            title height = number
            1
            {
                x = number
                y = number
                width = number
                height = number
            }
            2
            {
                ...
            }
        }
    }
}
```

Attention now turns to control server state updates that are applied to clients. When a display client first starts, it looks at the client setup file for the name and port number of the control server to connect to in order to receive state updates. When it connects, it sends its name and resolution to the control server. This is later used by the control server to determine relevant state updates to send to the display client. After the client connects, the control server sends all of the state information that is relevant to the client. The relevant state information consists of all of the camera definitions, all the information for all of the clients and all of the templates that match the resolution of the client. The reason that the definitions of all of the clients must be sent is that the 'link to' variable may be used at any time to link the client to any other client. Finally, any other state that is global to all the clients such as the server port number is sent.

The state information sent from the server is sent as ASCII text with the same curly brace delimiting and white space shown in the previous examples. An alternate embodiment includes elimination of unnecessary white space and compression of the data with any of a number of widely known compression and/or binary encoding schemes for text.

When a control client or other agent updates the state in the control server, only the updated information is sent to the appropriate clients. Given that the state follows variable scope rules, it is not sufficient to only send name=value variable definitions. The proper key name hierarchy starting at the top level with curly brace delimiting must also be sent. This is because there will be multiple variables that use the same names. A simple example are the x,y values for a template window corner.

The appropriate information sent in these updates follows the same rules as when the full state is sent when a client first connects. Updates to all camera and client definitions are sent, all updates to template definitions for resolutions matching those of the client and all global information not specific to any client.

The invention has been fully described. Attention now turns to a discussion of alternate embodiments and enhancements of the invention. The control server state information can be encoded using Extensible Markup Language (XML) rather than using curly braces to define hierarchy. XML also provides additional benefits, such as allowing easier addition of support for new key name types. As mentioned previously, HTTP POST commands can also be used to send commands to the video control server in addition to HTTP GET commands. A command can be sent to the control server from any network device capable of forming http GET or POST commands. This includes an application server in addition to a Web browser.

Figure 5:
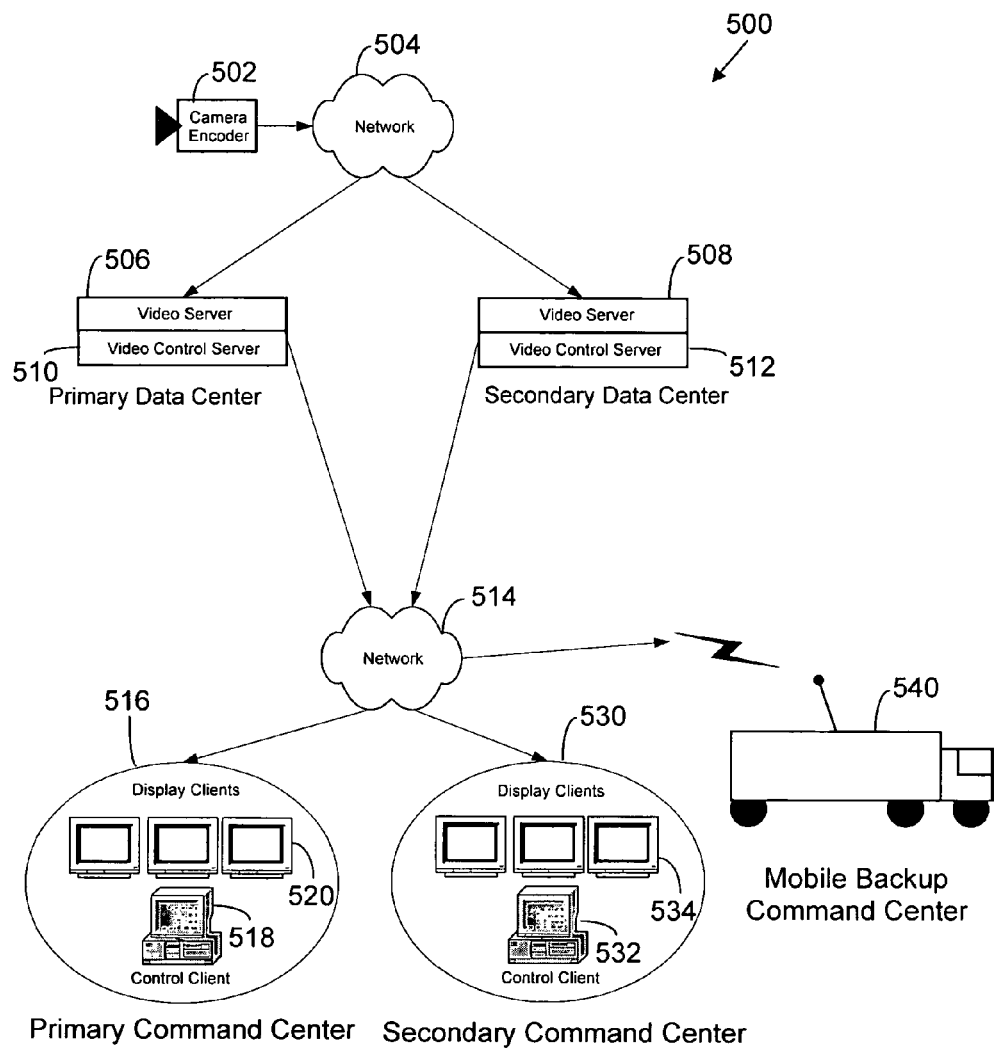
FIG. 5 illustrates a high availability system configured in accordance with an embodiment of the invention.

In many applications for digital video delivery, it is important to provide high availability of that video even in the face of hardware and network failures. FIG. 5 shows a system 500 that uses the present invention to provide automatic failover in a variety of failure scenarios. A camera and encoder 502 are used to generate a digital video stream connected to an IP network 504. Using one of a variety of well known methods, the IP video stream is sent to two video servers 506, 508 simultaneously. This can either be done by generating two independent streams sent to one of each of two video servers or by using IP multi-casting to send a single stream to both servers. The two servers 506, 508 are located in separate data centers, a primary and secondary data center, preferably at different locations so that natural disasters and power failures are not likely to affect both at the same time. Within each of the two data centers there are also video control servers 510, 512. The video server 506 in the primary data center will be called the primary video server and the video control server 510 in that data center will be called the primary video control server. Accordingly, the servers in the secondary data center will be called the secondary video server 508 and the secondary video control server 512.

Each of the command centers contain at least one control client and display client. FIG. 5 illustrates a primary command center 516 with a control client 518 and display clients 520. A network 514 links the primary command center 516 to the video server 506 and the video control server 510 of the primary data center. Similarly, a secondary command center 530 includes a control client 532 and display clients 534. Not shown in this figure, but also assumed in order to allow a Web GUI for the control clients are conventional Web servers. For maximum reliability, it is recommended that these Web servers be located in each of the command centers. There are two cases that need to be handled: the loss of the primary data center or one of the servers within it and the loss of the primary command center.

The configuration of the state within the video control servers is an important part of enabling rapid and automatic failover. Each physical camera and encoder is configured to generate a digital video stream that is sent to primary video server 506 and secondary video server 508. The video servers receive these video streams and then are able to transmit them to the display clients in the command centers 516, 530. The output streams of the primary video servers for each of the cameras will be called the primary camera stream instances and the output streams of the secondary video servers will be called the secondary camera stream instances. The camera stream instances are used in the definition of the url variable in the camera name keys where the properties of each camera are defined. Both video control servers use the same camera names to describe the same physical cameras. Therefore, the primary video control server state definition uses the primary stream instances within the camera key definitions and the secondary video control server uses the secondary stream instances within its camera key definitions. A camera definition in the state of the primary video control server may look like:

```
cameras
{
  FirstCamera
  {
    url = protocol://primary_video_server_1/..
    no rotation = false
    isarchive = false
  }
}
```

The camera definition for the same camera in the state definition of the secondary video control server may look like:

```
cameras
{
  FirstCamera
  {
    url = protocol://secondary_video_server_1/..
    no rotation = false
    isarchive = false
  }
}
```

The server key in the state definition for both video control servers is augmented with an additional variable called "heartbeat". This variable is used to set the rate with which a heartbeat message is sent from a video control server to all of the clients that are connected to it. The value of this variable sets the number of seconds between heartbeat messages:

```
server
{
  port = 1066
  heartbeat = 15
}
```

In the client setup file of each display client, there are several additional variables that are used to control failover. These are the host name and port of the secondary video control server and the heartbeat interval to expect heartbeat signals from the video control server:

```
server
{
  host = linux3
  port = 1066
  host2 = linux4
  port2 = 1066
  heartbeat = 15
  client name = 1
}
```

In the event of the failure of the entire primary data center, the primary video control server 510 or the network link from the primary data center to the primary command center, the display clients can automatically failover using these additional variables. If the display clients fail to see the heartbeat signal for longer than the heartbeat variable time in seconds, they assume that the primary data center is no longer online and that they must switch to the secondary data center. They stop listening for state updates from the primary video control server 510 and connect to the secondary video control server 512 defined by the host and port2 variables. When they connect, the secondary video control server sends them its copy of the state and all subsequent updates. It also begins sending the clients the heartbeat signal. The state information from the secondary video control server has camera definitions that cause the display clients to connect to the video servers in the secondary data center, so transparent failover will have been achieved in a very short period. A heartbeat period of 15 seconds is very reasonable, and the clients can reconnect to the secondary data center in seconds after the heartbeat is lost. This fast and transparent failover is very difficult or impossible to achieve with other methods. Note that until the clients connect to the secondary video control server 512, it does not send them anything since it does not know about them. Once they connect, it begins to send state and heartbeat signals. For this to work properly, all state update commands sent from the primary control client must be sent to both the primary and secondary video control servers. The state on the two video control servers should be identical except for the camera URL definitions. All of the camera names, client names and templates should be kept identical.

For the case of the failure of a video server in the primary data center, there are two solutions. The first is the use of conventional clustering. This is well known in the art and would involve having a standby video server ready to take over in the event of the failure of one of the video servers. The second solution is a manual one, but leverages the capabilities of the invention. When a video server in the primary data center fails, video from it will be lost at the primary command center. An operator at this command center can then initiate manual failover to the secondary data center. This can easily be done through a single click on a link or button on a Web page that sends a URL command to the primary video control server to set the heartbeat variable to zero, causing the stopping of all heart beat signals from the primary video control server. This will cause all of the display clients to failover to the secondary data center. It would also be possible for a display client to detect a loss of video data from a video server and use that to trigger a failover to the secondary video control server.

Failure of a command center is also easily handled. To facilitate smooth failover, each of the command centers has the same number of display clients and each command center uses a common list of client names in the client setup files. Therefore, the first display client in all of the command centers will have the same client name and so on. This means that all the same display clients in each of the command centers receive the same commands from the currently active video control server. Therefore, the same video will be displayed in the same windows in all of the first display clients in all of the command centers and so on. This makes each command center an exact copy of the primary command center. The only difference is that only the one control client in one command center is allowed to send state updates to the video control servers. During normal operation, this will be the control client in the primary command center.

In the event of the failure of the primary command center 516 or its network connection, the secondary command center 530 can take control in several ways. A manual approach can be used: some form of alternate communications channel can be used between the command centers to decide which of the alternate command centers should take over system operations. This could be done through a phone call via a phone network or an alternate data network. Alternately, the primary control client 518 could send a regular state update command to both the primary control server 510 and the secondary control server 512. This state update is a special piece of state that is used as a heartbeat signal between the control clients. This state value can be implemented as a monotonically increasing number and an update rate in seconds. This state also includes the host names of the control clients.

```
control
{
    heartbeat_signal = 00001234
    rate = 15
    primary_control_client = control_client1
    secondary_control_client = control_client2
    tertiary_control_client = control_client3
}
```

The list of control clients in the 'control' key above is used to define a failover order for the control clients. The primart_control_host is responsible for updating the heartbeat_signal value. The secondary_control_host reads this value periodically and if it does not see the value updated with the rate period, it takes over by updating this state key to:

```
control
{
    heartbeat_signal = 00000000
    rate = 15
    primary_control_client = control_client2
    secondary_control_client = control_client3
    tertiary_control_client = control_client1
}
```

To prevent two control clients from getting into conflict over the modification of the video control server state, several rules are enforced at the video control server. The secondary and tertiary control clients are only allowed to read the video control state and only write the primary, secondary and tertiary control client variables in the 'control' key. Only the primary control client is allowed to modify the heartbeat_signal value and the other state in the video control server.

During failover, the sequence of events associated with one embodiment of the invention is as follows. The primary control client 518 fails to update the heartbeat_signal value in time or at all. The secondary control client 532 detects this and modifies the primary, secondary and tertiary control client variables in the 'control' key as shown in the above example. This now locks out the primary control client 518 from updating the heartbeat_signal. The secondary control client signals the human operator at the workstation that the primary command center is no longer in control and that the secondary command center is. With the secondary control client now able to make all state updates to the video control servers, the human operators in the secondary command center are now able to take control of the management of the system. In a like fashion, a mobile backup command center 540 can also take over from the secondary command center 530 should it also fail.

There are a number of variables that can be added to the cameras key to provide enhancements to the display client functions. Here is an example of an enhanced key definition for cameras. The enhancements to the key definition are shown in bold.

```
cameras
{
    camera name
    {
        url = protocol://host/etc
        label = label string
        highlight = true | false
        timestamp = true | false
        disable = true | false
        isarchive = true | false
        //Archive specific sub-keys
        seek event = unique string
        seek time = time
        time = time
        command event = unique string
        command = playforward | playbackward | pause | stop
        play rate = frames per second
        seek percentage = seek by percentage of total archive length
        skip frames = number of frames to skip
        loop = true | false
```

```
        start time = time
        stop time = time
        event time = time; seconds1; seconds2
        }
    camera name 2
        {
        ...
        }
    }
}
```

The label variable provides a text string that will be displayed at the top of the video window in the display client that is displaying the camera. This provides a way to put a useful name or title above the camera being displayed. The highlight variable allows the selection of a highlight color for the border and title area of the video window. This color is defined in the template key. The time stamp variable is used to enable display of a time value overlay on the video. This time value can be derived from a local time source on the client computer or from a network source or from time information imbedded in the video stream. The disable variable allows disabling of a particular camera so that it will not be shown in the display client. This is useful if a particular video feed is not available or if a system manager decides that the video feed should not be viewed. The play rate variable is used for video archives whose playback speed can be controlled by specifying a playback frame rate. In the preferred embodiment, this value can take on fractional values ranging from 0.1 to 30. The seek percentage is a fractional value between 0 and 1 to set the seek time in a video archive. This is useful because it does not require the application program making the API call to the video control server to cause seeking to know the time value of the place in the video archive to seek. The skip frames variable specifies an integer value used to speed up archive playback by skipping frames. A skip frame value of 0 causes no frames to be skipped, so archive playback speed is unaffected. A skip frame value of 1 causes every other frame to be skipped causing playback to be sped up by 2×. A skip frame value of 3 causes 3× playback and so forth.

The remaining enhancement variables are used to control looping behavior on archives. There are two ways to do this. First, the loop, start time and stop time variables may be used or the single event time variable may be used. When the loop variable is set to true, the start time and stop time values are used to define the start and end of a segment of an archive to loop over. The display client program initiates commands to the video server storing the archive to begin playback at the start time. The display client then monitors the time during the archive playback and when the end time is reached, it restarts playback at the start time. This causes the playback to loop over the segment of interest. If the loop variable is set to true and the start time and end time are not defined, the display client causes the archive playback to loop over the full time range of the archive. The event time variable has three arguments, a time and two time durations in seconds. If this variable is defined, it causes the display client to loop the playback of the video archive over the segment defined by time−seconds1 to time+seconds2.

The template key can be enhanced with a new sub-key that holds all the appearance settings for the windows in the template. The changes are shown in bold.

```
templates
    {
    "resolution name 1"
        {
        "template name"
```

```
            {
            1
                {
                x = number in pixels
                y = number in pixels
                width = number in pixels
                height = number in pixels
                }
            2
                {
                x = number in pixels
                y = number in pixels
                width = number in pixels
                height = number in pixels
                }
            }
        view settings
            {
            border = number
            title height = number
            fixed color = sixhexdigits
            fixed text color = sixhexdigits
            highlight color = sixhexdigits
            highlight text color = sixhexdigits
            rotate color = sixhexdigits
            rotate text color = sixhexdigits
            }
        }
```

The original border and title height variables have been moved inside a new view settings sub-key along with six new color definition variables. The original active color and inactive color variables have been superseded in this enhancement. The fixed color variable defines the RGB value for the border color of the fixed windows and the fixed text color variable defines the RGB value for the text used to display the label text string at the top of the window. Similarly, the highlight color and highlight text color define the border and text color for the highlighted window. And, the rotate color and rotate text color define the border and text color for the rotating windows.

The clients key can be enhanced with the addition of a fixed window sub-key with a list of window panes and cameras to display in a set of windows in the template. The enhancements to the clients key are shown in bold.

```
clients
    {
    client name 1
        {
        template = name
        dwell time = number
        camera rotation
            {
            1 = first camera name
            2 = second camera name
            ...
            force rotation = true
            }
        fixed windows
            {
            1 = camera name 1
            6 = camera name 6
            ...
            }
        }
    client name 2
        {
        }
    }
```

The entries in the fixed window sub-key define a set of window panes in the template. In the example here, fixed cameras are defined for window panes 1 and 6. The panes are defined by a number in the template definition. For each fixed window, there is one camera that will be displayed continuously. When there are fixed windows defined for a client, cameras in the camera rotation key will be rotated through the remaining window panes.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A video control server, comprising:
a central processing unit; and
a memory storing a state update application program interface and executable instructions to
receive control station commands indicating a change in how network video sources are to be accessed and displayed by a second client different than a first client, the control station commands created by the first client, wherein the first client comprises a control client workstation to generate the control station commands,
update state information at the video control server specifying how network video sources are to be accessed and displayed by the second client based on the control station commands, wherein the second client comprises a display client to access a video source specified in the state information, and
send the state information to the second client, the second client to directly access a video server to receive a video source specified in the state information, the video server located on a hardware device distinct from both the first and second clients; and
the video control server in communication with the control client workstation and a web server host.

2. The video control server of claim 1 wherein the video control server is configured as an HTTP server.

3. The video control server of claim 1 wherein the state update application program interface is responsive to a dump command.

4. The video control server of claim 1 wherein the state update application program interface is responsive to a get command.

5. The video control server of claim 1 wherein the state update application program interface is responsive to a set command.

6. The video control server of claim 1 wherein the state update application program interface is responsive to a multi-set command.

7. The video control server of claim 1 wherein the state update application program interface is responsive to a remove command.

8. The video control server of claim 1 wherein the video control server, the web server host and the control client workstation are operative with a second video control server, a second web server host and a second control client workstation for high availability operation.

9. The video control server of claim 1 wherein the memory storing the executable instructions to update state information include executable instructions to update state information to specify a video source.

10. The video control server of claim 9 wherein the memory storing the executable instructions to update state information include executable instructions to update state information to specify a size and position for the display of information from the video source.

11. The video control server of claim 1 wherein the memory storing the executable instructions to update state information include executable instructions to update state information to specify a sequence of video sources to be accessed.

12. The video control server of claim 1, wherein the second client is a user-less display client having no keyboard or mouse.

13. A non-transitory computer readable medium including executable instructions to:
define, at a video control server, an application program interface to process configuration commands indicating a change in how network video sources are to be accessed and displayed by a second client different than a first client, the configuration commands created by the first client, wherein the first client comprises a control client workstation to generate the control station commands;
update, based upon the configuration commands, state information specifying how network video sources are to be accessed and displayed by a second client in response to the configuration commands, wherein the second client is different than the first client; and
send the state information to the second client, the second client to directly access a video server to receive a video source specified in the state information, the video server located on a hardware device distinct from both the first and second clients, wherein the second client comprises a display client to access a video source specified in the state information and the video control server is in communication with the client control workstation and a web server host.

14. The non-transitory computer readable medium of claim 13 wherein the executable instructions to update state information include executable instructions to update state information to specify a video source.

15. The non-transitory computer readable medium of claim 14 wherein the executable instructions to update state information include executable instructions to update state information to specify a size and position for the display of information from the video source.

16. The non-transitory computer readable medium of claim 13 wherein the executable instructions to update state information include executable instructions to update state information to specify a sequence of video sources to be accessed.

* * * * *